United States Patent
Storms et al.

(10) Patent No.: US 8,346,413 B2
(45) Date of Patent: Jan. 1, 2013

(54) WIRELESS DISPLAY UNIT FOR ECP TRANSITION SYSTEM

(75) Inventors: Patrick Storms, Carthage, NY (US);
Richard Matusiak, Watertown, NY (US); John LaDuc, Harrisville, NY (US); Bryan McLaughlin, Watertown, NY (US); Gary S. Newton, Adams, NY (US); Dale R. Stevens, Adams Center, NY (US); Jon M. Marra, Henderson, NY (US)

(73) Assignee: New York Air Brake Corporation, Watertown, NY (US)

( * ) Notice: Subject to any disclaimer, the term of this patent is extended or adjusted under 35 U.S.C. 154(b) by 406 days.

(21) Appl. No.: 12/673,606

(22) PCT Filed: Sep. 8, 2008

(86) PCT No.: PCT/US2008/075602
§ 371 (c)(1),
(2), (4) Date: Feb. 16, 2010

(87) PCT Pub. No.: WO2009/035943
PCT Pub. Date: Mar. 19, 2009

(65) Prior Publication Data
US 2011/0153124 A1 Jun. 23, 2011

Related U.S. Application Data

(60) Provisional application No. 60/971,338, filed on Sep. 11, 2007.

(51) Int. Cl.
*G05D 1/00* (2006.01)
*B60T 13/74* (2006.01)

(52) U.S. Cl. ............................................. 701/19; 303/3
(58) Field of Classification Search ................... 701/19, 701/20, 2, 29.1–29.9, 36, 70, 76; 303/15, 303/7, 3, 8, 127, 128, 20, 16, 28, 86, 22.6, 303/22.2, 167; 246/182 B, 167 R, 3, 4, 182 R, 246/26; 340/438; 105/26.05
See application file for complete search history.

(56) References Cited

U.S. PATENT DOCUMENTS
6,189,980 B1 2/2001 Kull
(Continued)

OTHER PUBLICATIONS
International Preliminary Report on Patentability, Pct/US2008/075602 filed Sep. 8, 2008.

*Primary Examiner* — James Trammell
*Assistant Examiner* — Muhammad Shafi
(74) *Attorney, Agent, or Firm* — Barnes & Thornburg LLP

(57) ABSTRACT

The present interface system includes a controller monitoring pressure on a locomotive brake pipe port, controlling pressure on a train brake pipe port in response to the pressure on a locomotive brake pipe port, providing ECP commands on an ECP trainline via a train electrical terminal in response to the pressure on the locomotive brake pipe port, and providing electrical power on the ECP trainline via an train electrical trainline terminal from the locomotive electrical trainline terminal. A transceiver is connected to the controller for wireless communication with the controller. A wireless display unit communicates via the transceiver with the controller and displays information from the controller to the operator remote from the interface system and provides inputs from the operator to the controller. The system also includes a three position change over valve. An event recorder and a GPS system may be connected to the controller.

11 Claims, 1 Drawing Sheet

U.S. PATENT DOCUMENTS

| | | |
|---|---|---|
| 6,217,126 B1 | 4/2001 | Kull |
| 6,286,913 B1 | 9/2001 | Mazur et al. |
| 6,676,229 B1 * | 1/2004 | Marra et al. .................. 303/7 |
| 6,776,268 B2 * | 8/2004 | Hart ........................ 188/153 R |
| 7,073,753 B2 | 7/2006 | Root et al. |
| 7,950,464 B2 * | 5/2011 | Atencio et al. ................ 166/360 |
| 2003/0160767 A1 * | 8/2003 | Wong et al. .................... 345/169 |
| 2005/0060070 A1 * | 3/2005 | Kapolka et al. ................. 701/29 |
| 2007/0284196 A1 * | 12/2007 | Sakai et al. ................... 187/305 |

* cited by examiner

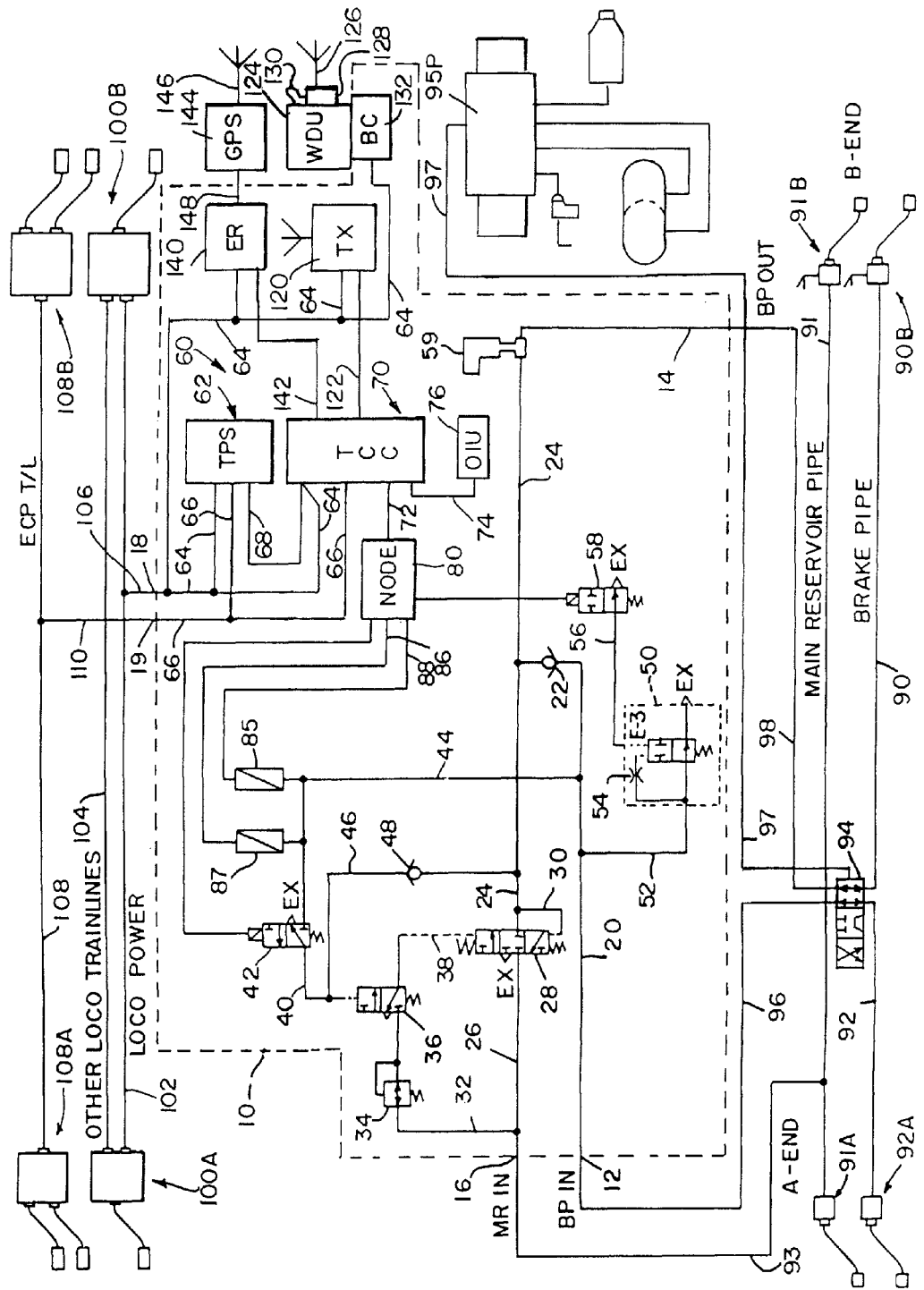

WIRELESS DISPLAY UNIT FOR ECP TRANSITION SYSTEM

BACKGROUND AND SUMMARY OF THE INVENTION

The present invention relates generally to railway pneumatic brake systems and, more specifically, to an interface between a pneumatic train brake control system and a train of electrically controlled pneumatic (ECP) brake equipped cars.

The freight train industry in the U.S. is transitioning from a completely pneumatically-controlled train to a train having ECP brake equipment on their cars. For the foreseeable future, not all locomotives will have the capability of interfacing with an ECP equipped train. They do not have the ability to provide the necessary power or electric control signals to the individual cars nor to control the brake pipe as required by the ECP cars. As presently configured, the train brake pipe is maintained at its charged value and is only used as a pneumatic back-up for failure of the ECP electrical control signals.

To meet this demand, various systems have been suggested. A limp-in control arrangement for ECP systems is described in U.S. Pat. No. 6,286,913. An interface which provides the appropriate level of power to the ECP trainline is described in U.S. Pat. No. 6,217,126. A locomotive to ECP brake conversion system which provides the appropriate power and control signals to the car trainline is described in U.S. Pat. No. 6,189,980. Another interface system is shown in U.S. Pat. No. 6,676,229.

The present interface system includes a controller monitoring pressure on a locomotive brake pipe port, controlling pressure on a train brake pipe port in response to the pressure on a locomotive brake pipe port, providing ECP commands on an ECP trainline via a train electrical terminal in response to the pressure on the locomotive brake pipe port, and providing electrical power on the ECP trainline via an train electrical trainline terminal from the locomotive electrical trainline terminal A transceiver is connected to the controller for wireless communication with the controller. A wireless display unit communicates via the transceiver with the controller and displays information from the controller to the operator remote from the interface system and provides inputs from the operator to the controller.

The display unit has an antenna electrically connected to the display unit and removable mounted to the display unit by a mount and the mount allows mounting the antenna to a locomotive. The mount is a magnetic mount. The display unit includes a chargeable power source and the interface system includes a charger for receiving the display unit and charging the power source. The wireless communication maybe WiFi.

The controller communicates train brake system status to the display unit and the display unit communicates display unit status to the controller. The controller communicates prompts of required action by the operator to the display unit. The system may include a GPS receiver connected to the controller and the controller performs speed limit enforcement using data from the GPS. The system controller communicates loss of data from the GPS receiver to the display unit. The system may include an event recorder connecting the GPS receiver to the controller.

These and other aspects of the present invention will become apparent from the following detailed description of the invention, when considered in conjunction with accompanying drawings.

BRIEF DESCRIPTION OF THE DRAWINGS

FIG. 1 is a schematic of an embodiment of an interface system incorporating the principles of the present disclosure.

DETAILED DESCRIPTION OF THE PREFERRED EMBODIMENTS

FIG. 1 illustrates an interface system 10 for interfacing a pneumatic train brake control system to a train of electrically-controlled pneumatic (ECP) brake equipped cars. The interface 10 includes a locomotive brake pipe port 12, a train brake pipe port 14, and a locomotive main reservoir pressure supply port 16. It also includes a locomotive electrical trainline terminal 18 and a train electrical trainline terminal 19. The interface system 10 monitors pressure on the locomotive brake pipe port 12 and controls the pressure on the train brake pipe port 14 in response to pressure on the locomotive brake pipe port 12. The interface 10 also provides ECP commands on the train electrical trainline terminal 19 in response to pressure on the locomotive brake pipe port 12 and provides electrical power on the train electrical trainline terminal 19 from the locomotive electrical trainline terminal 18.

The locomotive brake pipe port 12 is connected to the train brake pipe port 14 by line 20, check valve 22 and line 24. The locomotive supply port 16 is connected to line 24 by line 26 and a train brake pipe valve 28. The train brake pipe valve 28 is shown as a three-position relay valve in its lap position. The relay valve 28 compares the pressure on the train brake pipe line 24 via line 30 against the pilot signal on line 38. The pilot signal on 38 is provided from the locomotive supply port 16 via line 32, a feed or pressure regulating valve 34 and a valve 36. The valve 36 is controlled via a signal on line 40, which is connected to the locomotive brake pipe port 12 and line 20 via line 44 and electropneumatic valve 42. The electropneumatic valve 42 is electrically controlled to connect the pressure on the locomotive brake pipe port 12 to move valve 36 from its shown exhaust position to a through position. This allows the regulated pressure from the locomotive supply port 16 to be applied to line 38 to pilot the relay valve 28.

The train brake pipe port 14 is also connected via line 24, check valve 48 and line 46 to the control input of valve 36. During charging, the check valve 48 is closed since the output of relay valve 28 is higher than the pressure on lines 46 and 40 (locomotive brake pipe port 12). If the pressure at the train brake pipe port 14, after charging, drops below that on lines 40 and 46, which is generally below the locomotive brake pipe port 12, check valve 48 will open. A vent valve 59 is also connected to the train brake pipe port 14 to sense an emergency condition and accelerate the blow down of the car brake pipe port pressure.

Interface 10 also includes a locomotive emergency valve. This valve includes a pneumatic valve 50 connected to the locomotive brake pipe port 12 via lines 52 and 20. Valve 50 is shown connecting the locomotive brake pipe port 12 to exhaust. When the pressure in the locomotive brake pipe port 12 is high enough via line 54, valve 50 moves down disconnecting line 52 from exhaust. A second control signal on line 56 from electropneumatic valve 58 also controls the position of emergency valve 50. Valve 58 receives its signals from the controller 60 to connect and disconnect line 56 from exhaust. If the controller 60 should fail, valve 58 will assume this exhaust position producing an emergency condition. The controller 60 also initiates power (throttle) cut-off on the locomotive(s) in response to an emergency.

The controller 60 in FIG. 1 is illustrated as including a trainline power supply module 62 connected to the locomotive electrical trainline terminal 18 via wire 64 and to the train electrical trainline terminal 19 via wire 66. It also provides a connection via line 68 to a trainline communications controller 70. Trainline communications controller 70 is also connected to the locomotive electrical trainline terminal 18 via wire 64 and to the train electrical trainline terminal 19 via wire 66. The trainline power supply module 62 and the trainline communications controller 70 are products available from New York Air Brake Corporation. Similar equivalent systems may be used and are a part of the known control systems in the locomotive for the ECP brake systems in a train. These systems take power from the locomotive electrical trainline terminal 18 and provide power and control signals on the car electrical trainline terminal 19 and the ECP trainline 108. The trainline communications controller 70 monitors the pressure at the locomotive brake pipe port 12 via transducers 85 and 87 and provides electrical control of electropneumatic valves 42 and 58 and converts this pressure to ECP trainline brake commands.

In this embodiment an input/output node 80 is connected to the trainline communications controller TCC 70 via line 72. The node 80 is connected to electropneumatic valve 42 via line 82 and to electropneumatic valve 58 via line 84. The node 80 is also connected to two transducers 85 and 87 via lines 86 and 88, respectively. The transducers 85 and 87 monitor the conditions in line 44, which is connected via line 20 to the locomotive brake pipe port 12. An operator interface unit 76 is connected via line 74 to the TCC 70. This provides an operator display for train set-up and other functions. Depending upon the type of TCC modules 70 used, node 80 may be eliminated and the connection to the TCC module 70 be made direct.

The elements of the system so far described are the same as in U.S. Pat. No. 6,676,229 and reference should be made thereto for complete explanation of their operation. U.S. Pat. No. 6,676,229 is incorporated herein by reference.

The interface system 10 mounted to a car having an A-end and a B-end. This is by way of example, and the terminals and ports of the interface system 10 may be connected individually to the appropriate locomotive and car terminals and connectors. A first brake pipe portion 90 is connected to a B-end connector 90B, and a second brake pipe portion 92 is connected to an A-end connector 92A. A change over valve 94 allows reversing the connection of the brake pipe portions 90 and 92 to the locomotive brake pipe port 12 and the car/train brake pipe port 14 via lines 96 and 98, respectively. The change over valve is a three position valve compared to the two position transition valve discussed in U.S. Pat. No. 6,676,229. The first two positions of the change over valve are the same as the two positions of the transition valve. The third position of the change over valve is a direct connection of the two brake pipe portions 90 and 92. This allows the locomotive brake pipe to control the car/train brake pipe for a standard pneumatic train.

In the position shown for the change over valve 94, the locomotive is at the A-end and its brake pipe connected at connector 92A, and the car at the B-end having its brake pipe connected to connector 90B. When the transition valve 94 is moved to the second position, the locomotive is at the B-end, and the car is at the A-end. In the first and second positions, the change over valve 94 isolates the two brake pipe portions 90 and 92. In the third position, the change over valve disconnects the locomotive brake pipe port 12 and the car/train brake pipe port 14 from the brake pipe portions 90 and 92 and directly connect the two brake pipe portions 90 and 92.

The locomotive supply port 16 is connected to a supply line 91 having connectors 91A and 91B. As illustrated and known in the industry, this is the main reservoir pipe of a locomotive consist.

The car illustrated in FIG. 1 has a standard pneumatic or conventional brake control valve 95P. It is connected by line 97 to the locomotive brake pipe port 12 by the change over valve 94 in all three of its positions. Thus the brake control valve 95P is responsive to the pressure on the locomotive brake pipe from the locomotive side for all positions of the change over valve 94. A standard pneumatic or conventional system 95P includes a pneumatic brake control valve, a pair of reservoirs, a retainer and a brake cylinder. All of these are shown but not marked, since they are well known. This provides a brake set on the car to which the interface system 10 is mounted. An EPC brake control valve may also be used as shown in FIG. 2 of U.S. Pat. No. 6,676,229, which is incorporated herein by reference.

For the electrical connections, electrical connectors 100A and 100B provide interconnection to the locomotive consist. Schematically, the locomotive power line 102 is shown, and the remainder of the locomotive trainlines are shown by a single line 104. These lines are the MU multi-unit lines well known in the freight industry. Locomotive power line 102 is connected via line 106 to the locomotive electrical trainline terminal 18 of the interface system 10. Train electrical trainline connectors 108A and 108B have an ECP trainline 108 there between to be connected to the train electrical trainline terminal 19. The ECP trainline 108 is connected via wire 110 to the train electrical trainline terminal 19.

The present interface system 10 includes a transceiver 120 connected to the TCC 70 via line 122. It is also powered via line 64. The transceiver 120 provides wireless communication with the controller 60. A wireless display unit WDU 124 communicates via the transceiver 120 with the controller 60 and displays information from the controller 60 to the operator of the locomotive remote from the interface system 10. In addition to the display of information, WDU 124 allows the operator to send commands to the TCC 70 such as ECP Trainline Empty/Load setting and ECP Trainline Power ON/Off setting. The wireless display unit WDU 124 may also be considered an operator interface unit.

The wireless display unit WDU 124 includes an antenna 126 removably mounted to the display unit by a mount 128 and electrically connected via line 130. The mount 128 allows the antenna 126 to be separated physically demounted from wireless display unit 124 and mounted to the vehicle to which the operator carries it. This is generally the lead locomotive. The mount 128 may be any well-known device, for example, a magnet. Suction cups or other devices may be used. The wireless display unit 124 includes a chargeable power supply, for example, a battery. The interface includes a charger 132 connected via line 64 to the source of power. The battery may be removed from the display unit 124 and connected to the charger 132 or the display unit 124 can have a terminal which mates with the charger 132.

The wireless communication between the transceiver 120 and the wireless display unit 124 may be via, for example, WiFi. Other communication protocols may be used. The wireless display unit WDU 124 should have a unique link to the corresponding TCC 70 to ensure that the data transmission there between is secure. A given WDU 124 may be initially linked by the operator to any available TCC 70. The WDU 124 will remain linked only to the specific TCC 70 until changed by the operator. Once and as long as the TCC 70 has established a link to a given WDU 124, the TCC 70 will reject all subsequent request for links from other WDUs. The communications are bidirectional to allow for error checking and interface heartbeat.

The information being transmitted from the controller 60 to the wireless display unit 124 for display includes train brake system status. This could include, for example, but not limited to brake pipe pressure at the end of train, percentage of operable brakes, ECP train brake commands, ECP status, train power status, any and all ECP interlocks and penalty brake applications, loss of power, empty load status etc.

Also various prompts may be transmitted from the control system 60 to the wireless display unit 124 for the operator in the lead locomotive. These would be, for example, informing the driver to place the conventional brake controller in a normal or graduated release mode. There may also be prompts to set the feed valve to various settings.

The wireless display unit 124 also displays its status and transmits this information to the controller 60. This may be, for example, the battery capacity indication and loss of communication between the wireless display unit 124 and the controller 60. Neither of these conditions may affect operation of the controller 60. Alternatively, the controller 60 may apply the brakes for loss of communication with the wireless display unit 124.

Set up procedures for ECP operation using the interface 10 follow the same sequence as standard EP-60 set-up. First, the last locomotive in the consist is mechanically coupled to the interface 10, and the Brake Pipe 90/92, Main Reservoir Pipe 91, and the battery MU lines 102, 104 are connected. The change-over valve 94 is set to point in the direction of the lead locomotive consist and an ECP End of Train (EOT) device is connected to the last car in the train. The end junction box 100 of the interface 10 is terminated per normal ECP Locomotive operation.

Next, the feed valve on the lead locomotive is set to 90+/−3 PSI, the independent brake is set to full and the automatic brake valve is moved to release to begin charging of the locomotive brake pipe. The feed valve setting or the brake pipe release pressure is verified by the interface 10 as an interlock as described below. At this time, brake pipe pressure developed by the lead locomotive consist will be exhausted at the interface 10 and train brake pipe will remain in an uncharged state.

The driver then exits the lead locomotive and enters the interface 10 and unlock its container. The interface 10 is powered it up by closing two circuit breakers within the interface 10. The operator then selects ECP Run or Switch mode on the Operator Interface Unit OIU 76. This will simultaneously apply power to the ECP train, and initiate an ECP full service brake interlock. The operator will then follow the prompts on the OIU 76 to initialize the ECP train. To initialize the ECP train, all normal ECP interlocks must be satisfied. These interlocks include establishing 100% train car operability, satisfactory end of train brake pipe pressure and communication between the TCC 70 and the WDU 124. After all the ECP interlocks are cleared, the locomotive and train brake pipe are charged.

One of the ECP interlocks is verification of the feed valve setting. The TCC 70 calls for a release. After a predetermined time, the locomotive brake pipe pressure is measured. If the measured brake pipe pressure is in a given range, for example 88 to 91 psi, the feed valve setting is confirmed. If it is not in the given range, the WDU 124 prompts the operator to adjust the feed valve setting up or down until the setting is confirmed. The actual Release Brake Pipe Pressure Charge on the train brake pipe is determined and updated as described below.

As part of the initialization of the interface 10 for ECP service, the driver establishes a communication link between the wireless display unit WDU 124 and the TCC 70, removes the WDU 124 from the interface 10, and locks the container for the interface 10. The Empty/Load setting and the power on/off of the interface 10 may be changed from the WDU 124. Valid communication between interface 10 and the display unit 124 is one of the interlocks. Loss of communication will cause the brakes to be applied by the interface 10.

There are various communication interlocks before communication can be established. In an ECP train, each of the car control brake devices CCD are connected as nodes in a network, generally by a train wire. The WDU 124 will be assigned a network ID which will allow a secure, direct one to one communication with the TCC 70, which is a node on the network. Standard network protocols will be enforced in order to establish communication. Also, if the TCC 70 is communicating with another node or remote device, communication will not be established with the WDU 124. As further verification that the WDU 124 is communicating with the TCC 70, the TCC 70 will transmit its ECP reporting mark which corresponding to the ID on the side of the car. The operator can visually verify this information.

Once these interlocks are satisfied, the operator is then prompted to select train Empty/Load setting. The WDU 124 is carried to the lead locomotive in preparation for ECP train operation. Once in the lead locomotive, the operator will follow the display unit 124 prompts to clear the last ECP interlock by making a Full Service Brake Pipe Reduction. Upon moving the automatic handle to release, the train brakes will release and initialization is complete. Now the interface 10 is set to follow the lead locomotive consist's brake pipe modulations to control the ECP braked train.

Another interlock is the synchronization of the locomotive and train brake pipe emergencies to the ECP system. This interlock is also used before the system 10 resets and ECP penalty and emergency states. Initially, the system 10 propagates an ECP penalty or emergency to the locomotive by reduction of the locomotive brake pipe to zero. The system 10 allows the locomotive and train brake pipes to charge prior to releasing the ECP interlock. The method includes enforcing a locomotive and train pneumatic emergency for a first predetermined time period, for example 60 seconds. After the first period, the system 10 charges the locomotive and train brake pipes for a second time period, for example 60 seconds. Once the locomotive brake pipe has charged to an acceptable range, as described above as 88 to 91 psi, the emergency is removed and the interlock is removed.

The interface 10 determines ECP Train Brake Commands from the Brake Pipe pressure changes from the lead locomotive consist. After the Full Service brake pipe reduction and release is made to clear the ECP full service interlock, the TCC 70 monitors locomotive brake pipe pressure and determines the release brake pipe pressure set point (locomotive feed valve setting). This release brake pipe charge level is used as the reference point from which brake pipe reductions are determined and translated. The operator Train Brake Call (% TBC) is based solely on Brake Pipe Pressure deviation from the Release Brake Pipe Pressure Charge. The translation of the operator called Brake Pipe Reduction to Train Brake Command is based on the Brake Pipe control characteristics of an AAR standard 26C type Locomotive Brake Valve.

The TCC 70 determines the Release Brake Pipe Pressure Charge within an acceptable range, for example 84 to 95 psi. The system uses an average of a given number of sample in a range narrower than the acceptable range, for example 10 samples in the range of 86 to 93 psi. Initially an average release set point pressure is base on 10 samples at 86 psi. If the system is in release and the measured brake pipe pressure is within the 86 to 93 psi range, the last sample is replaced by the new sample and a new average is calculated. If the sample is higher then 93 psi, replace the oldest sample with 93 psi and recalculate the average. The sampling is conducted continuously at a fixed rate, for example every one second. The set point is reset after a given number of consecutive samples being during a release, for example two consecutive samples.

When the conventional brake valve is placed in the Minimum position creating a 5-7 psi reduction in brake pipe, the Train Brake Command TBC is 10% (ECP minimum service application). The 10% Train Brake Command is maintained until a brake pipe reduction of 8 PSI or greater is detected. When a brake pipe reduction of 22 PSI from the highest brake pipe charge level is detected, the Train Brake Command is 100% (ECP full service application). In order to protect against undesired changes in TBC as a result of small fluctuations in brake pipe pressure, the TBC doesn't change until Brake pipe changes an entire PSI with respect to the highest brake pipe set point. This ensures that Brake Pipe Reductions between 8 PSI and 22 PSI change the TBC 6% for every 1 PSI change in Brake Pipe pressure (making the TBC resolution in the service brake range equal to 6%). This same calculation holds true for reducing the TBC, to enable graduated release. When a Brake Pipe Reduction of 45 PSI or greater is made, the Train Brake Command is 120% (ECP emergency brake application).

This specific translation is shown in the following Table 1:

TABLE 1

Brake Pipe Reduction to Train Brake Call Translations

| BRAKE PIPE REDUCTION (BBR) [PSI] | TRAIN BRAKE CALL (0-100%) |
|---|---|
| 0 = BPR < 5 | 0% |
| 5 = BPR < 8 | 10% |
| 8 = BPR < 9 | 16% |
| 9 = BPR < 10 | 22% |
| 10 = BPR < 11 | 28% |
| 11 = BPR < 12 | 34% |
| 12 = BPR < 13 | 40% |
| 13 = BPR < 14 | 46% |
| 14 = BPR < 15 | 52% |
| 15 = BPR < 16 | 58% |
| 16 = BPR < 17 | 64% |
| 17 = BPR < 18 | 70% |
| 18 = BPR < 19 | 76% |
| 19 = BPR < 20 | 82% |
| 20 = BPR < 21 | 88% |
| 21 = BPR < 22 | 94% |
| 22 = BPR < 45 | 100% |
| BPR $\geq$ 45 | 120% |

The system 10 also includes a connection to an event recorder 140 connected to the TCC 70 via line 142. It is powered off line 64. The event recorder 140 may be for example a Profiler system from New York Air Brake Corporation. The event recorder 140 exchanges information between the subsystems for recording operator actions and train status with respect to time. A GPS system 144 with antenna 146 is also provided and connected to event recorder 140 by line 148. The GPS system provides speed, time and date input to the TCC 70. This allows the TCC 70 to use the speed for speed limit enforcement and the time for time updates. With loss of the GPS speed input to TCC 70, it cannot perform enforcement of a penalty brake application. The TCC 70 would then inform the operator via transponder 120 and the wireless display unit 124 of loss communication and prompt the operator to manage the speed. Upon recovery of the GPS signal, speed limit enforcement in the Switch mode is resumed.

Although the present system has been described and illustrated in detail, it is to be clearly understood that this is done by way of illustration and example only and is not to be taken by way of limitation. The scope of the present system is to be limited only by the terms of the appended claims.

What is claimed:

1. An interface system for interfacing a pneumatic train brake control system to a train of electrically controlled pneumatic (ECP) brake equipped cars, the interface system comprising:
    a controller monitoring pressure on a locomotive brake pipe port, the controller controlling pressure on a train brake pipe port in response to the monitored pressure on the locomotive brake pipe port, the controller providing ECP commands on an ECP trainline via a train electrical trainline terminal in response to the monitored pressure on the locomotive brake pipe port, and providing electrical power on the ECP trainline via the train electrical trainline terminal from the locomotive electrical trainline terminal;
    a transceiver connected to the controller for wireless communication with the controller; and
    a wireless display unit for communication via the transceiver with the controller and displaying information from the controller to the operator remote from the interface system and providing inputs from the operator to the controller,
    wherein communication is not established between the controller and the display unit if the controller is communicating with a device other than the display unit, and wherein once, and as long as, communication is established between the display unit and the controller, the controller rejects all request for links from devices other than the display unit to ensure secure, bidirectional communication between the display unit and the controller to enable error checking and interface heartbeat.

2. The system according to claim 1, wherein the display unit includes a chargeable power source and the interface system includes a charger for receiving the display unit and charging the power source.

3. The system according to claim 1, wherein the controller communicates one of train brake system status and prompts of required action by the operator to the display unit and the display unit communicates display unit status to the controller.

4. The system according to claim 1, including a GPS receiver connected to the controller and the controller performs speed limit enforcement using data from the GPS and the controller communicates loss of data from the GPS receiver to the display unit.

5. The system according to claim 1, wherein the display unit transmits one of empty/load setting and power on/off to the controller.

6. The system according to claim 1, wherein the controller, the ECP brake equipped cars and the display unit are nodes on a network.

7. The system according to claim 1, wherein the controller resets an ECP penalty and emergency after the locomotive brake pipe ports have a pressure in a predetermine range after a predetermined period of time.

8. The system according to claim 1, wherein the controller determines a release pressure form the locomotive brake pipe port by averaging a given number of samples of pressure during release.

9. An interface system for interfacing a pneumatic train brake control system to a train of electrically controlled pneumatic (ECP) brake equipped cars, the interface system comprising:
- a controller monitoring pressure on a locomotive brake pipe port, the controller controlling pressure on a train brake pipe port in response to the monitored pressure on the locomotive brake pipe port, the controller providing ECP commands on an ECP trainline via a train electrical trainline terminal in response to the monitored pressure on the locomotive brake pipe port, and providing electrical power on the ECP trainline via the train electrical trainline terminal from the locomotive electrical trainline terminal;
- a transceiver connected to the controller for wireless communication with the controller; and
- a wireless display unit for communication via the transceiver with the controller and displaying information from the controller to the operator remote from the interface system and providing inputs from the operator to the controller,
- wherein communication is not established between the controller and the display unit if the controller is communicating with a device other than the display unit, and
- wherein the display unit has an antenna electrically connected to the display unit and removable mounted to the display unit by a mount and the mount allows mounting the antenna to a locomotive.

10. An interface system for interfacing a pneumatic train brake control system to a train of electrically controlled pneumatic (ECP) brake equipped cars, the interface system comprising:
- a controller monitoring pressure on a locomotive brake pipe port, the controller controlling pressure on a train brake port in response to the monitored pressure on the locomotive brake pipe port, the controller providing ECP commands on an ECP trainline via a train electrical trainline terminal in response to the monitored pressure on the locomotive brake pipe port, and providing electrical power on the ECP trainline via the train electrical trainline terminal from the locomotive electrical trainline terminal;
- a transceiver connected to the controller for wireless communication with the controller; and
- a wireless display unit for communication via the transceiver with the controller and displaying information from the controller to the operator remote from the interface system and providing inputs from the operator to the controller,
- wherein communication is not established between the controller and the display unit if the controller is communicating with a device other than the display unit, and
- wherein the controller maintains an ECP brake applied command until communication has been established with the display unit and generates one of an ECP brake applied command and a pneumatic brake applied command upon loss of communication with the display unit.

11. An interface system for interfacing a pneumatic train brake control system to a train of electrically controlled pneumatic (ECP) brake equipped cars, the interface system comprising:
- a controller monitoring pressure on a locomotive brake pipe port, the controller controlling pressure on a train brake pipe port in response to the monitored pressure on the locomotive brake pipe port, the controller providing ECP commands on an ECP trainline via a train electrical trainline terminal in response to the monitored pressure on the locomotive brake pipe port, and providing electrical power on the ECP trainline via the train electrical trainline terminal from the locomotive electrical trainline terminal;
- a transceiver connected to the controller for wireless communication with the controller; and
- a wireless display unit for communication via the transceiver with the controller and displaying information from the controller to the operator remote from the interface system and providing inputs from the operator to the controller,
- wherein communication is not established between the controller and the display unit if the controller is communicating with a device other than the display unit, and
- wherein the controller assumes control of the train brake pipe port and the ECP trainline after release of interlocks and one of the interlocks includes a feed valve of the locomotive having a value in a predetermined pressure range.

* * * * *